US012753077B2

(12) United States Patent
Wang et al.

(10) Patent No.: US 12,753,077 B2
(45) Date of Patent: Oct. 6, 2026

(54) METHOD FOR PREPARING LITHIUM MANGANESE IRON PHOSPHATE, CATHODE MATERIAL, AND LITHIUM-ION BATTERY

(71) Applicant: PHYLION BATTERY CO., LTD., Suzhou (CN)

(72) Inventors: Zhengwei Wang, Suzhou (CN); Yongchen Wang, Suzhou (CN); Na Li, Suzhou (CN); Huajun Zhu, Suzhou (CN); Fuzhao Liu, Suzhou (CN)

(73) Assignee: PHYLION BATTERY CO., LTD., Suzhou (CN)

( * ) Notice: Subject to any disclaimer, the term of this patent is extended or adjusted under 35 U.S.C. 154(b) by 632 days.

(21) Appl. No.: 18/210,054

(22) Filed: Jun. 14, 2023

(65) Prior Publication Data

US 2023/0322557 A1 Oct. 12, 2023

Related U.S. Application Data

(63) Continuation-in-part of application No. PCT/CN2022/128489, filed on Oct. 31, 2022.

(30) Foreign Application Priority Data

Apr. 1, 2022 (CN) ........................ 202210339154.8

(51) Int. Cl.
*C01B 25/26* (2006.01)
*C01B 25/30* (2006.01)
(Continued)

(52) U.S. Cl.
CPC ............ *C01B 25/265* (2013.01); *C01B 25/30* (2013.01); *C01B 25/377* (2013.01); *C01B 25/45* (2013.01); *H01M 10/0525* (2013.01)

(58) Field of Classification Search
CPC ....... C01B 25/30; C01B 25/45; C01B 25/265; C01B 25/377; H01M 10/0525
See application file for complete search history.

(56) References Cited

U.S. PATENT DOCUMENTS

2013/0029227 A1 1/2013 Song et al.

FOREIGN PATENT DOCUMENTS

CN 1897333 A 1/2007
CN 104466161 A 3/2015
(Continued)

OTHER PUBLICATIONS

Machine Translation of CN 1897333 A (Year: 2007).*
Machine Translation of CN 104868123 A (Year: 2015).*
Machine Translation of CN 110803691 A (Year: 2020).*

*Primary Examiner* — Sathavaram I Reddy
(74) *Attorney, Agent, or Firm* — SZDC Law PC

(57) ABSTRACT

The invention provides a method for preparing lithium manganese iron phosphate, which includes the following steps: S1: mixing a manganese source and/or an iron source in solid phase to obtain a first mixture; S2: sintering the first mixture in solid phase at 300° C. to 1200° C. to obtain a manganese iron oxide (MnxFe1−x−y)mOn; S3: mixing the manganese iron oxide (MnxFe1−x−y)mOn with a lithium source, a phosphorus source, and optionally a manganese source and/or an iron source in solid phase to obtain a second mixture; and S4: sintering the second mixture in solid phase at 350° C. to 900° C. to obtain lithium manganese iron phosphate LiMnxFe1−x−yPO4, wherein 0≤x≤1, and 0≤y≤1. The method of the present invention can be used to prepare a lithium manganese iron phosphate material with high tap density, long cycle life, low costs, and high cost-effectiveness.

8 Claims, 3 Drawing Sheets

(51) Int. Cl.

| | |
|---|---|
| ***C01B 25/37*** | (2006.01) |
| ***C01B 25/45*** | (2006.01) |
| ***H01M 10/0525*** | (2010.01) |

(56) References Cited

FOREIGN PATENT DOCUMENTS

| | | | |
|---|---|---|---|
| CN | 104538628 | A | 4/2015 |
| CN | 104752715 | A | 7/2015 |
| CN | 104868123 | A | 8/2015 |
| CN | 106299296 | A | 1/2017 |
| CN | 110803691 | A | 2/2020 |
| CN | 110980682 | A | 4/2020 |
| CN | 113036118 | A | 6/2021 |
| CN | 113683122 | A | 11/2021 |
| CN | 114644328 | A | 6/2022 |
| CN | 114804056 | A | 7/2022 |

* cited by examiner

METHOD FOR PREPARING LITHIUM MANGANESE IRON PHOSPHATE, CATHODE MATERIAL, AND LITHIUM-ION BATTERY

This application is a continuation-in-part application of PCT/CN2022/128489, filed on Oct. 31, 2022, which claims priority to Chinese Patent Application No. 202210339154.8, filed on Apr. 1, 2022, which is incorporated by reference for all purposes as if fully set forth herein.

FIELD OF THE INVENTION

The present invention relates to the technical field of lithium-ion battery preparation, and specifically to a method for preparing lithium manganese iron phosphate, a cathode material prepared by the lithium manganese iron phosphate, and a lithium-ion battery.

DESCRIPTION OF THE RELATED ART

In lithium-ion batteries, the commonly used cathode materials are shown in Table 1 below:

TABLE 1

| Material | Voltage/V | Actual specific capacity (mAh/g) |
|---|---|---|
| Lithium iron phosphate | 3.2 (2.5 to 3.8 V) | 150 |
| Lithium manganese iron phosphate $LiMn_{0.6}Fe_{0.4}PO_4$ | 3.9 (2.7 to 4.3 V) | 150 |
| Lithium manganate | 3.7 (2.7 to 4.3 V) | 110 |
| Lithium-rich manganese | 3.7 (2.0 to 4.8 V) | 120 to 300 |
| Nickel 55 ternary(NCM550540) | 3.6 (2.7 to 4.3 V) | 175 |
| 622 ternary(NCM602020) | 3.6 (2.7 to 4.3 V) | 180 |
| Nickel 65 ternary(NCM650530) | 3.6 (2.7 to 4.3 V) | 185 |
| 811 ternary(NCM801010) | 3.6 (2.7 to 4.3 V) | 200 |

Ternary cathode materials (lithium nickel cobalt manganate or lithium nickel cobalt aluminum oxide) are generally used to replace lithium cobaltate and are applied in the field of power batteries. Ternary cathode materials have low-temperature discharge performance, normal-temperature cycle performance, and high-temperature cycle performance, and have the highest energy density. It can be seen from the table that with the increase of nickel content, the gram capacity of the material gradually increases, but the thermal decomposition temperature of the material decreases, which leads to the decrease of the safety of lithium-ion batteries with the ternary cathode material system. On the other hand, low-nickel ternary materials such as 111 ternary materials (NCM111) have high cobalt content and are therefore expensive. Materials having a nickel content exceeding 70% (the ratio of the nickel content to the total content of nickel, cobalt, and manganese or aluminum), for example, high-nickel 811 ternary materials (NCM801010), require the introduction of an oxygen atmosphere during the sintering process and are therefore also expensive. In addition, cobalt and nickel are expensive because of their low abundance in the earth. Based on this, ternary materials are more suitable for medium- and high-end vehicles with long mile range.

The synthesis of ternary cathode materials requires oxygen to participate in the reaction. Generally, manufacturers sinter materials having a medium or low nickel content only in air, and sinter materials having a high nickel content (where the nickel content is greater than 0.7) in an oxygen atmosphere. In addition, because high-nickel materials are sensitive to air humidity and are likely to absorb moisture and lead to the formation of lithium carbonate on the material surface, and packaging and coating of battery formulation have strict humidity requirements, labor costs of high-nickel materials are higher than those of medium-nickel materials. In recent years, the safety accidents of long-range electric vehicles with high-nickel ternary materials have occurred frequently, which has led to the decline of the popularity of high-nickel ternary materials in the industry. At present, the pursuit of high-nickel ternary materials has gradually shifted to the use of medium-nickel ternary materials. With the progress of research and development and the pursuit of cost reduction in the market, the application of low-cobalt and cobalt-free ternary materials has been accelerated, and the cobalt content has been gradually reduced to 0.05 or even 0.03. However, since cobalt is naturally accompanied by nickel in minerals, pure nickel also contains 3% to 5% of cobalt, there is no need to spend costs to remove the cobalt content in high-nickel ternary materials.

Lithium manganate materials have obviously better safety performance than that of ternary cathode materials, have excellent low-temperature performance and rate performance and low costs, but have a low gram capacity (about 110 mAh/g) and a short cycle life, especially poor high-temperature cycle performance. Therefore, lithium manganate alone cannot be used as a cathode material.

As a representative of new cathode materials, lithium-rich manganese-based materials have a specific capacity of up to 250 mAh/g when charged to 4.8 V, but their cycle performance is unstable. At present, the mainstream mature commercial electrolyte solutions operate at 4.2 V, an electrolyte solution having an operating voltage of 4.3 to 4.4 V is used for single crystal ternary materials, and electrolyte solutions having an operating voltage of 5 V are not mature. Therefore, lithium-rich manganese-based materials are not widely used, and only a small amount of them are used for doping with lithium manganate to delay the rapid attenuation of lithium manganate in the early stage of cycle.

Lithium iron phosphate is a common cathode material for lithium-ion batteries, which has a long cycle life and excellent safety performance. Due to its poor conductivity, lithium iron phosphate is fabricated into a small particle size in commercial applications to compensate for its rate performance. However, lithium iron phosphate with a small particle size also cannot discharge electricity at low temperature. In addition, because its discharge capacity is concentrated in the plateau zone, it is difficult to calibrate the state of charge with the voltage, resulting in poor user experiences. The compaction density of lithium iron phosphate is low, only 2.4 to 2.5 g/cm$^3$. The compaction density of lithium manganate can reach 3.1 g/cm$^3$, and the compaction density of a ternary cathode material can reach 3.4 g/cm$^3$. In addition, the nominal voltage of lithium iron phosphate batteries is only 3.2 V. Therefore, the volume energy density of lithium iron phosphate is very low. Based on this, $LiMnPO_4$, $LiCoPO_4$, $LiNiPO_4$, $LiMnSiO_4$, $LiFeSiO_4$, $LiCoSiO_4$, and $LiNiPSiO_4$ are promising materials to replace lithium iron phosphate. Compared with silicate systems, phosphoric acid systems are more commercially mature. Among the four elements of manganese, cobalt, nickel, and iron, cobalt and nickel are the most expensive, while manganese and iron are the most inexpensive. However, the conductivity of lithium manganese phosphate is extremely poor, which is worse than that of lithium iron phosphate. Doping manganese with lithium iron phosphate or doping iron with lithium manganese phosphate is to synthesize lithium manganese iron phosphate by using the high potential plateau of manganese and the structural stability of iron. Therefore, lithium manganese iron phosphate obtained through manganese or iron doping has the characteristics of both lithium manganese phosphate and lithium iron phosphate, and these three substances can also be classified into the same class of materials, and expressed by a chemical formula $LiMn_xFe_{1-x}PO_4$. At present, lithium manganese iron phosphate is already commercially mature, but its conductivity is worse than that of lithium iron phosphate, and its low-temperature discharge performance is weaker, so it has not been used as a cathode material alone. Lithium manganese iron phosphate has a plateau voltage of up to 4.1 V, a medium voltage of up to 3.9 V, the same gram capacity and cycle life as those of lithium iron phosphate, and extremely high safety performance in 4.2 to 4.3 V systems, and therefore can be doped into a ternary material to improve the safety performance of overcharge and nail penetration.

At present, methods for synthesis of lithium iron phosphate include a solid phase method and a liquid phase method. The liquid phase method mainly uses ferrous sulfate heptahydrate, phosphoric acid, and lithium hydroxide to hydrothermally generate lithium iron phosphate, lithium sulfate, and water, but requires high equipment costs and generally requires the use of three times the amount of lithium hydroxide as a precipitant. This leads to the extra consumption of 200% of the amount of lithium hydroxide, increasing the costs. The solid phase method includes ferrous oxalate, iron oxide red, and ferric phosphate methods. The reaction process of the ferrous oxalate method involves the generation of a large amount of carbon dioxide, which leads to high carbon loss, easy fluctuation of carbon content, poor product consistency, and low tap density of the product; and also involves the release of ammonia gas, which pollutes the environment. The costs of the iron oxide red method are low, and lithium iron phosphate synthesized by this method has a high density but low capacity. This method also involves the release of ammonia gas, which pollutes the environment. The ferric phosphate method does not involve the generation of ammonia gas, has an environmental-friendly production process and large output, and has become the mainstream production process. There are two methods for synthesizing ferric phosphate: a ferrous sulfate method and an iron powder-phosphoric acid method. Both the two methods require the use of phosphoric acid and hydrogen peroxide and have high anti-corrosion requirements of equipment, resulting in high costs and great pressure on environmental protection.

At present, methods for synthesizing lithium manganese iron phosphate mainly include a solid phase method and a coprecipitation method. The solid phase method uses a manganese source, an iron source, a phosphorus source, and a lithium source for sintering, has a simple process, but cannot achieve high material performance. Therefore, the coprecipitation method is the mainstream. In the coprecipitation method, a manganese source, an iron source, and a complexing agent generate a precursor through coprecipitation, and the precursor reacts with a phosphorus source and a lithium source in solid or liquid phase to obtain lithium manganese iron phosphate, for example, as disclosed in Chinese Patent Application CN105047922A.

It can be seen that no matter whether $x=0$ or $x\neq0$ in $LiMn_xFe_{1-x}PO_4$, the lithium iron phosphate material can be synthesized by a solid phase method or a liquid phase method. The solid phase method has a simple process, but cannot achieve high material performance; while the liquid phase method can achieve good performance but involves high costs and great pressure on environmental protection. Therefore, a new process is needed to synthesize a $LiMn_xFe_{1-x}PO_4$ material, to improve the performance of the material at low costs.

SUMMARY OF THE INVENTION

The present invention provides a method for preparing lithium manganese iron phosphate, which can be used to prepare a lithium manganese iron phosphate material with high tap density, long cycle life, low costs, and high cost-effectiveness. The present invention also provides a cathode material prepared from the material and a lithium-ion battery.

The method for preparing lithium manganese iron phosphate provided by the present invention comprises the following steps:

S1: mixing a manganese source and/or an iron source in solid phase to obtain a first mixture;

S2: sintering the first mixture in solid phase at 300° C. to 1200° C. to obtain a manganese iron oxide $(Mn_xFe_{1-x-y})_mO_n$;

S3: mixing the manganese iron oxide $(Mn_xFe_{1-x-y})_mO_n$ with a lithium source, a phosphorus source, and optionally a manganese source and/or an iron source in solid phase to obtain a second mixture; and S4: sintering the second mixture in solid phase at 350° C. to 900° C. to obtain lithium manganese iron phosphate $LiMn_xFe_{1-x-y}PO_4$, wherein $0\leq x\leq1$, $0\leq y\leq1$, $1:2\leq m:n\leq1:1$, and $0\leq n\leq4$.

In the prior art, the solid phase method for synthesizing lithium manganese iron phosphate involves mixing a manganese source, an iron source, a phosphorus source, and a lithium source followed by sintering, has a simple process, but cannot achieve high material performance. On the basis of this, the present invention provides a novel preparation method. In the method, first, a manganese source and an iron source are mixed and then sintered in solid phase, so that the manganese source and the iron source are thermally decomposed to obtain manganese iron oxide $(Mn_xFe_{1-x-y})_mO_n$. Then, the manganese iron oxide $(Mn_xFe_{1-x-y})_mO_n$ is mixed with a lithium source and a phosphorus source, and sintered in solid phase to obtain lithium manganese iron phosphate $LiMn_xFe_{1-x-y}PO_{4-z}$. The preparation method is also simple, can prepare lithium manganese iron phosphate at low costs, has the characteristics of high tap density and compaction density, high energy density, small specific surface area, low self-discharge rate and long cycle life, and is obviously superior to lithium manganese iron phosphate prepared by conventional solid phase and liquid phase methods. The main reason is as follows. In the method of the present invention, manganese iron oxide, i.e., a precursor of lithium manganese iron phosphate, is synthesized first. The true density of manganese iron oxide is higher than that of iron oxide but lower than that of manganese oxide, and the true density of iron oxide is higher than that of an iron salt such as ferrous sulfate. Then, lithium manganese iron phosphate is synthesized. In contrast, in the conventional solid phase method, lithium manganese iron phosphate is synthesized by using an iron source, a manganese source, a lithium source, and a phosphorus source. Because of the existence of the low-density iron source, the synthesized lithium manganese iron phosphate material has a low tap density and large specific surface area, and electrode plates prepared from this material has a low compaction density, low energy density, high self-discharge rate, and poor cycle performance. In the conventional liquid phase method, manganese iron carbonate or manganese iron hydroxide, which has porous and fluffy morphology and low density, is obtained through coprecipitation. The lithium manganese iron phosphate material synthesized by coprecipitation of the manganese iron source, a lithium source, and a phosphorus source also has the characteristics of low tap density and large specific surface area, and electrode plates prepared from this material has a low compaction density, low energy density, high self-discharge rate, and poor cycle performance. In addition, the particles of the lithium manganese iron phosphate precursor, i.e., manganese iron oxide, synthesized by the method of the present invention have a primary large single crystal morphology and high true density, so the finally synthesized lithium manganese iron phosphate material can achieve a high tap density, high compaction density of electrode plates, high battery energy density, small specific surface area of the material, low self-discharge rate, and long cycle life.

The manganese source may be various manganese compounds commonly used in the art, and is not limited in the present invention. The manganese source may or may not contain crystal water. Preferably, the manganese source is selected from the group consisting of manganese sulfate, manganese carbonate, manganese acetate, manganese phosphate, manganese nitrate, manganese oxalate, and manganese citrate.

The iron source may be various iron compounds commonly used in the art, and is not limited in the present invention. The iron source may or may not contain crystal water. Preferably, the iron source is selected from the group consisting of ferrous sulfate, ferrous carbonate, ferrous acetate, ferrous phosphate, ferrous nitrate, ferrous oxalate, ferrous citrate, ferric sulfate, ferric carbonate, ferric acetate, ferric phosphate, ferric nitrate, ferric oxalate, and ferric citrate.

The lithium source may be various lithium compounds commonly used in the art, and is not limited in the present invention. Preferably, the lithium source is selected from the group consisting of lithium carbonate, lithium hydroxide, lithium phosphate, lithium oxalate, lithium acetate, lithium sulfate, lithium nitrate, and lithium chloride.

The phosphorus source may be various phosphorus-containing compounds commonly used in the art, and is not limited in the present invention. Preferably, the phosphorus source is selected from the group consisting of ammonium dihydrogen phosphate, diammonium hydrogen phosphate, sodium dihydrogen phosphate, disodium hydrogen phosphate, sodium tripolyphosphate, phosphoric acid, calcium phosphate, phosphate ester, lithium dihydrogen phosphate, iron phosphate, lithium phosphate, lithium dihydrogen phosphate, and manganese phosphate.

In the step S1 of the present invention, the manganese source or the iron source may also be used alone. When the manganese source is used alone, both lithium manganese phosphate and lithium manganese iron phosphate can be prepared (where the iron source is added in the step S3). Similarly, when the iron source is used alone, both lithium iron phosphate and lithium manganese iron phosphate can be prepared (where the manganese source is added in the step S3). The iron source and/or the manganese source added in the step S3 is preferably an iron oxide and/or a manganese oxide.

In the present invention, the amounts of the manganese source, the iron source, the lithium source, and the phosphorus source to be added are mainly determined based on the stoichiometric ratio of the synthesis reaction equation of manganese iron oxide $(Mn_xFe_{1-x-y})_mO_n$ and lithium manganese iron phosphate $LiMn_xFe_{1-x-y}PO_4$.

Preferably, in the steps S1 and S3, one or more of a carbon source, an M source, and an N source are added during the solid-phase mixing; and after the solid phase sintering in the steps S2 and S4, manganese iron oxide $(Mn_xFe_{1-x-y}M_y)_mO_nN_z/C$ and lithium manganese iron phosphate $LiMn_xFe_{1-x-y}M_yPO_{4-z}N_z/C$ are obtained respectively; wherein, the M source is a doped cation source and the N source is a doped anion source; and $0 \leq x \leq 1$, $0 \leq y \leq 1$, $0 \leq z \leq 0.1$, and $1:2 \leq m:(n+z) \leq 1:1$. Examples include FeO, $Fe_2O_3$, and $Fe_3O_4$, $(Mn_{0.5}Fe_1)_2O_4$ $(MnFe_2O_4)$, $MnO_2$.

In the present invention, when the carbon source is added, a carbon-coated lithium manganese iron phosphate material can be formed. The carbon source may be one or more of an organic carbon source and an inorganic carbon source. Preferably, the carbon source is selected from the group consisting of sucrose, glucose, fructose, citric acid, phenolic resin, polyvinyl alcohol, polyethylene glycol, starch, carbon black, acetylene black, graphite, graphene, and conductive carbon tubes.

In the present invention, when the M source is added, a cation-doped lithium manganese iron phosphate material can be obtained. The M source may be a single cation source or a combination of multiple cation sources. Preferably, the cation source includes one or more of elements selected from the group consisting of aluminum, magnesium, nickel, cobalt, titanium, copper, calcium, niobium, chromium, zinc, lanthanum, antimony, tellurium, strontium, tungsten, indium, and yttrium.

In the present invention, when the N source is added, an anion-doped lithium manganese iron phosphate material can be obtained. The N source may be a single anion source or a combination of multiple anion sources. Preferably, the anion source includes one or more of elements such as fluorine and sulfur.

By means of the preparation method of the present invention, materials such as olivine-type lithium manganese iron phosphate, layered lithium salt of polybasic acid, spinel-type lithium manganate, and layered manganese-rich lithium-based material can be obtained.

A cathode material of the present invention is obtained by mixing one or more of the olivine-type lithium manganese iron phosphate, the layered lithium salt of polybasic acid, the spinel-type lithium manganate, and the layered manganese-rich lithium-based material.

The present invention provides a lithium-ion battery, which comprises a cathode plate, an anode plate, an electrolyte solution, and a separator, wherein the cathode plate is prepared from the above cathode material.

Compared with the prior art, the present invention has the following beneficial effects:

1. The present invention provides a novel method for solid-phase synthesis of lithium manganese iron phosphate by improving the synthesis process. The lithium manganese iron phosphate material synthesized by the method has a high tap density, high compaction density and small specific surface area, and lithium-ion batteries prepared by the method have the characteristics of high energy density, low self-discharge rate, and long cycle life.

2. The lithium manganese iron phosphate material synthesized by the present invention has the advantages of low costs and high cost-effectiveness.

DETAILED DESCRIPTION OF THE PREFERRED EMBODIMENTS

Unless otherwise defined, meanings of all technical and scientific terms used in this specification are the same as those usually understood by a person skilled in the art. Terms used in this specification are merely intended to describe objectives of specific embodiments, but are not intended to limit the present invention. The term "and/or" used herein includes any and all combinations of one or more of associated items listed.

The present invention will be further described below in conjunction with the accompanying drawings and specific embodiments, so that those skilled in the art can better understand implement the present invention, but the embodiments described are not intended to limit the present invention.

The methods given in examples below are all conventional methods, unless otherwise stated. The materials and reagents are all commercially available unless otherwise stated.

EXAMPLE 1

$MnSO_4 \cdot H_2O$ was used as a manganese source and $FeSO_4 \cdot 7H_2O$ was used as an iron source. The molar ratio of $MnSO_4 \cdot H_2O$ to $FeSO_4 \cdot 7H_2O$ was 9:1. Then, the two materials were mixed in solid phase. The uniformly mixed materials were heated to 600° C. and sintered in solid phase to obtain a lithium manganese iron phosphate precursor $(Mn_{0.9}Fe_{0.1})_2O_3$. The reaction equation was:

$$18MnSO_4 \cdot H_2O + 2FeSO_4 \cdot 7H_2O \rightarrow 10(Mn_{0.9}Fe_{0.1})_2O_3 + 20SO_2\uparrow + 32H_2O\uparrow + 5O_2\uparrow.$$

$(Mn_{0.9}Fe_{0.1})_2O_3$, lithium carbonate, and ammonium dihydrogen phosphate were mixed and milled, and sintered in solid phase at 500° C. to obtain lithium manganese iron phosphate $LiMn_{0.9}Fe_{0.1}PO_4$. The reaction equation was:

$$2(Mn_{0.9}Fe_{0.1})_2O_3 + 2Li_2CO_3 + 4NH_4H_2PO_4 \rightarrow 4LiMn_{0.9}Fe_{0.1}PO_4 + 2CO_2\uparrow + 4NH_3\uparrow + 6\,H_2O\uparrow + O_2\uparrow.$$

Figure 1:
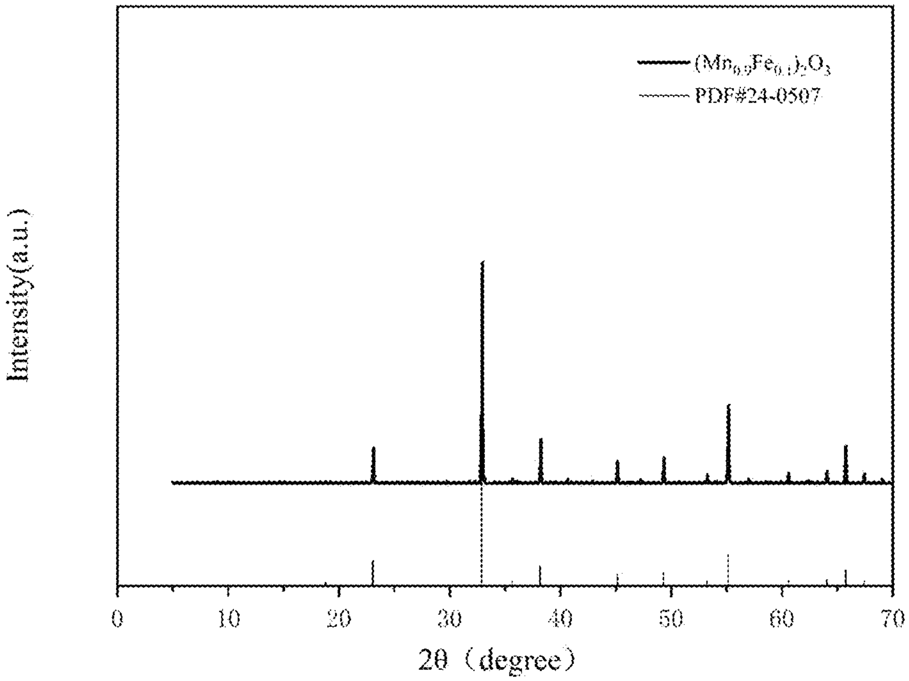
FIG. 1 is an XRD pattern of $(Mn_{0.9}Fe_{0.1})_2O_3$ in Example 1 of the present invention.

The black thick line in FIG. 1 denotes an X-ray diffraction (XRD) pattern of $(Mn_{0.9}Fe_{0.1})_2O_3$, i.e., the precursor of $LiMn_{0.9}Fe_{0.1}PO_4$. It can be seen that the substance synthesized by this scheme corresponds well to the $(Mn_{0.983}Fe_{0.017})_2O_3$ peak of colorimetric card PDF#24-0507.

Figure 2:
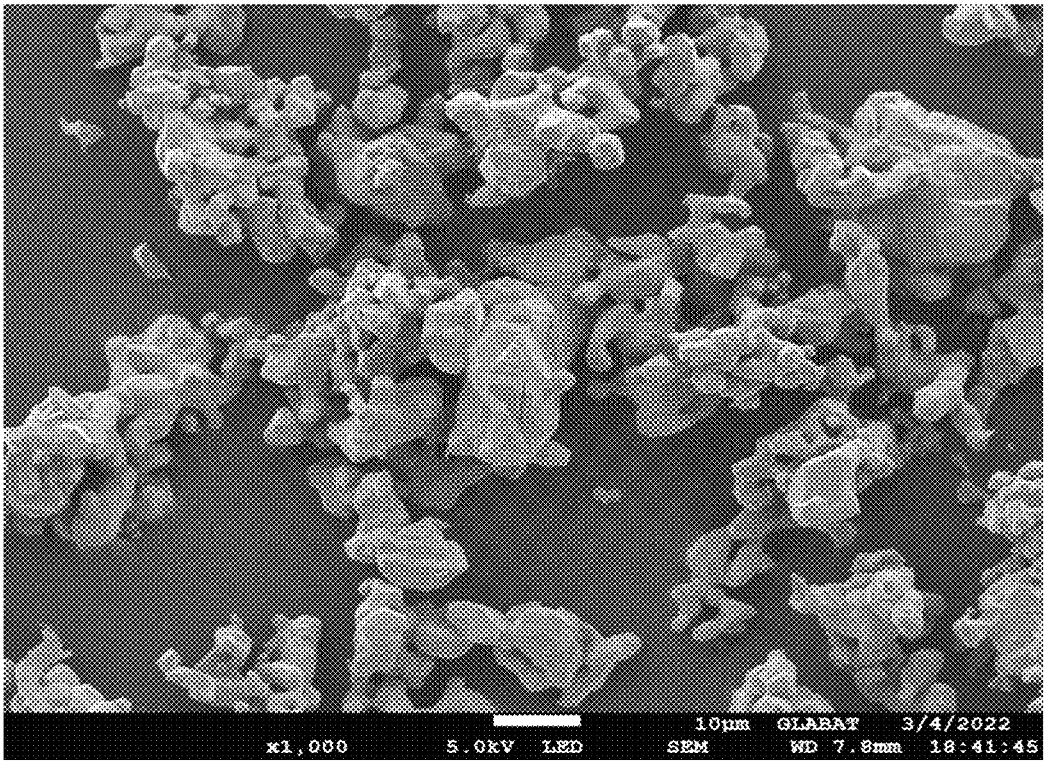
FIG. 2 is an SEM image of $(Mn_{0.9}Fe_{0.1})_2O_3$ in Example 1 of the present invention.

FIG. 2 is an SEM image of $(Mn_{0.9}Fe_{0.1})_2O_3$, showing that this substance is a homogeneous substance with good morphology. The particle size and tap density of the material were measured. The D50 diameter was 6 μm, and the tap density was as high as 2.4 g/cm$^3$. Therefore, the compound synthesized in this scheme was manganese iron oxide, not a simple mixture of manganese oxide and ferric oxide.

Figure 3:
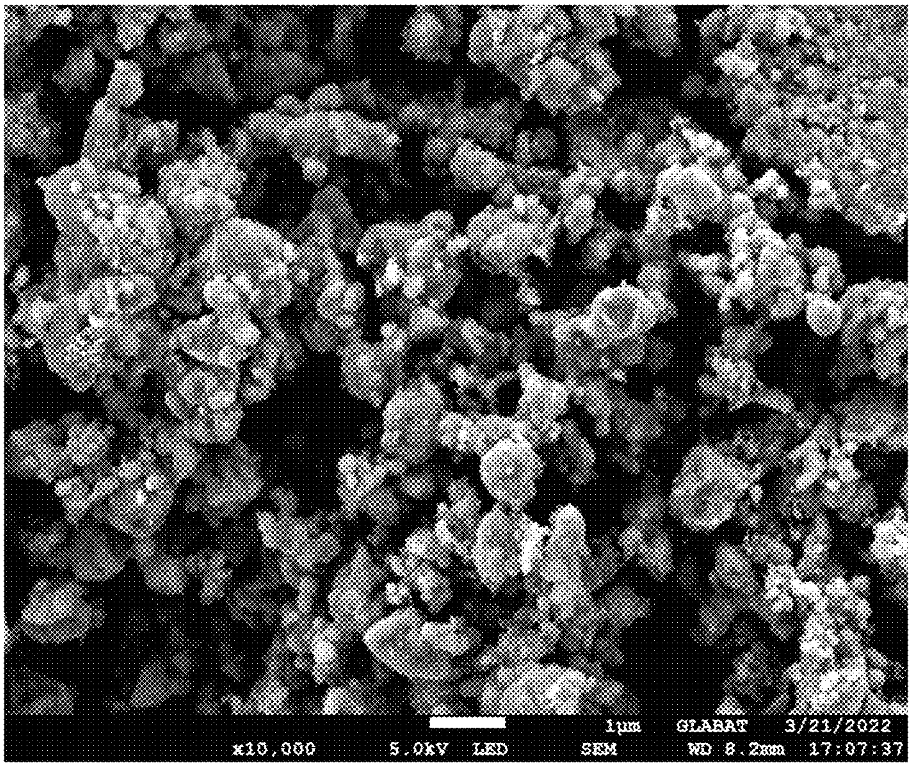
FIG. 3 is an SEM image of $LiMn_{0.9}Fe_{0.1}PO_4$ in Example 1 of the present invention.

FIG. 3 is a scanning electron microscopy (SEM) image of lithium manganese iron phosphate $LiMn_{0.9}Fe_{0.1}PO_4$, showing that the morphology of the material was good. The particle size and tap density of the material were measured. The D50 diameter was 2 μm, and the tap density was as high as 1.5 g/cm$^3$.

EXAMPLE 2

$MnSO_4 \cdot H_2O$ was used as a manganese source and $FeSO_4 \cdot 7H_2O$ was used as an iron source. The molar ratio of $MnSO_4 \cdot H_2O$ to $FeSO_4 \cdot 7H_2O$ was 6:4. Then, the two materials were mixed in solid phase. The uniformly mixed materials were heated to 500° C. and sintered in solid phase to obtain a lithium manganese iron phosphate precursor $(Mn_{0.9}Fe_{0.1})_2O_3$. The reaction equation was:

$$12MnSO_4 \cdot H_2O + 8FeSO_4 \cdot 7H_2O \rightarrow 10(Mn_{0.6}Fe_{0.4})_2O_3 + 20SO_2\uparrow + 68H_2O\uparrow + 5O_2\uparrow.$$

$(Mn_{0.9}Fe_{0.1})_2O_3$, lithium carbonate, and ammonium dihydrogen phosphate were mixed and milled, and sintered in solid phase at 500° C. to obtain lithium manganese iron phosphate $LiMn_{0.6}Fe_{0.4}PO_4$. The reaction equation was:

$$2(Mn_{0.6}Fe_{0.4})_2O_3 + 2Li_2CO_3 + 4NH_4H_2PO_4 \rightarrow 4LiMn_{0.6}Fe_{0.4}PO_4 + 2CO_2\uparrow + 4NH_3\uparrow + 6H_2O\uparrow + O_2\uparrow.$$

Figure 4:
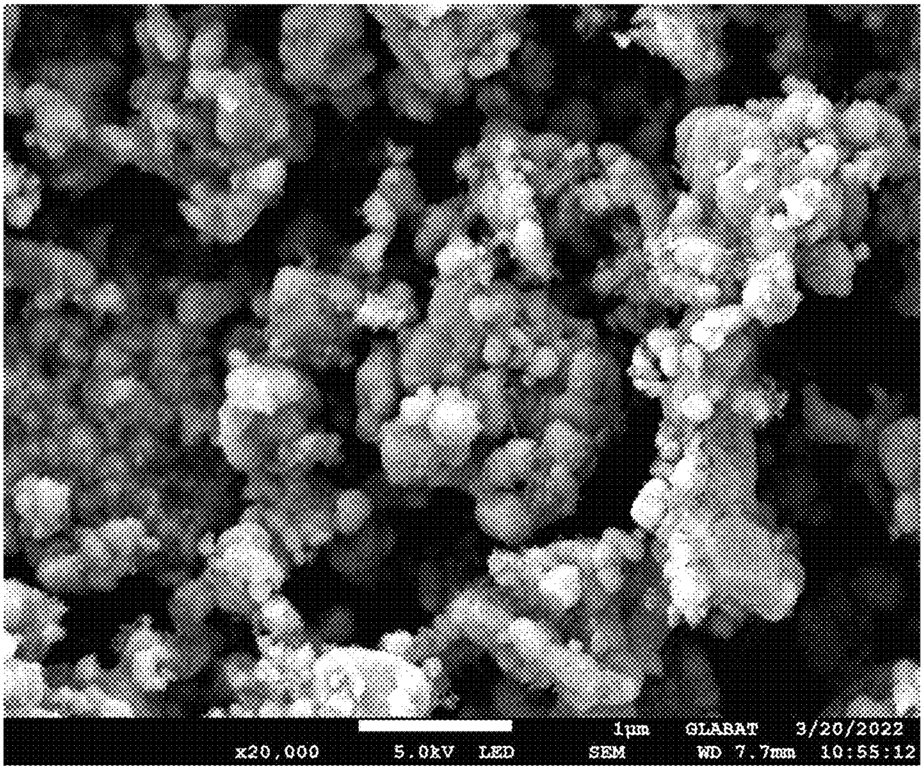
FIG. 4 is an SEM image of $LiMn_{0.9}Fe_{0.1}PO_4$ in Example 2 of the present invention.

FIG. 4 is a scanning electron microscopy (SEM) image of lithium manganese iron phosphate $LiMn_{0.6}Fe_{0.4}PO_4$. It can be seen from the image that the prepared lithium manganese iron phosphate material has a good morphology.

The particle size, specific surface area, and tap density of the material were tested. The results showed that the D50 diameter of the material was 1.5 μm; the specific surface area of the material was 15 $m^2/g$, much lower than the specific surface area of 20 $m^2/g$ of currently commonly used commercial materials; the tap density of the material was as high as 1.3 $g/cm^3$, much higher than the tap density of 0.8 to 1.0 $g/cm^3$ of currently commonly used commercial materials; and the compaction density of the material was 2.8 $g/cm^3$, much higher than the compaction density of 2.3 $g/cm^3$ of currently commonly used commercial materials. A higher compaction density allows for a high roll density of electrode plates, and as the thickness of electrode plates is reduced, a given battery case can accommodate more electrode plates, enabling the battery to have a higher energy density. In addition, the low specific surface area can reduce the content of binder, make the proportion of active substances higher, thereby further improving the energy density of the battery. Moreover, the low specific surface area reduces the side reactions between the material and the electrolyte solution, and improves the storage performance and cycle life of the battery.

EXAMPLE 3

A mixture of spinel-type lithium manganate $LiMn_2O_4$ and the lithium manganese iron phosphate $LiMn_{0.6}Fe_{0.4}PO_4$ prepared in Example 2 was used as an active material of a cathode plate of a lithium-ion battery. The spinel-type lithium manganate material and the lithium manganese iron phosphate material respectively accounted for 80% and 20% of the active material.

The cathode active material was mixed with a conductive agent and a binder to prepare a cathode slurry. Solid substances in the slurry included 97.2% of the active material, 1.7% of the conductive agent (conductive carbon black, conductive graphite, conductive carbon nanotubes, and graphene), and 1.1% of the binder (polyvinylidene fluoride). The content of a solvent N-methylpyrrolidone was adjusted so that the solid content of the slurry was about 75%. The evenly mixed slurry was respectively coated on surfaces of a current collector aluminum foil, which was then dried, rolled and cut to obtain a cathode plate.

The cathode plate was assembled into a cylindrical full battery. The full battery was charged at 0.5 C and discharged at 1 C to test cycle performance. The cylindrical battery has a model of R34235, with a diameter of 34 mm and a height of 235 mm.

Comparative Example 1

A mixture of spinel-type lithium manganate $LiMn_2O_4$ and a lithium manganese iron phosphate $LiMn_{0.6}Fe_{0.4}PO_4$ prepared by a conventional liquid phase method was used as an active material of a cathode plate of a lithium-ion battery. As a contrast sample, the spinel-type lithium manganate material and the lithium manganese iron phosphate material respectively accounted for 80% and 20% of the active material.

The cathode active material was prepared into a cylindrical full battery according to the same method as in Example 3.

Figure 5:
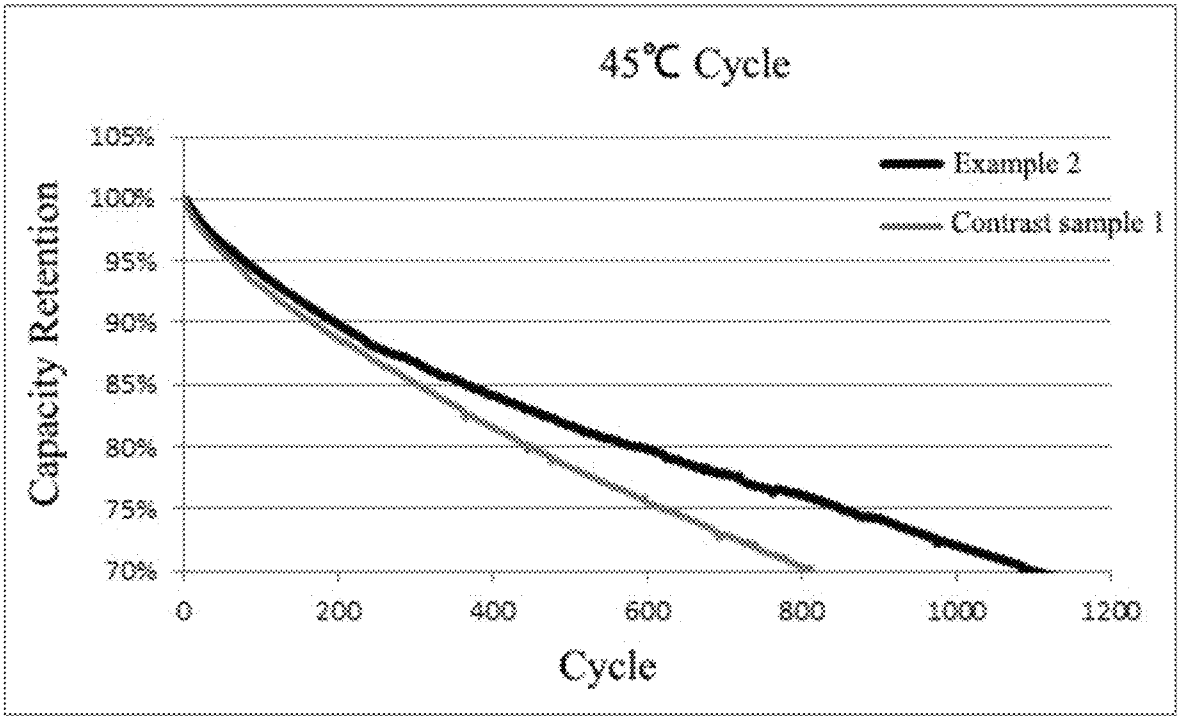
FIG. 5 is a cyclic performance test diagram of cylindrical full batteries prepared in Example 3 and Comparative Example 1 of the present invention.

As shown in FIG. 5, for cycle fading to 70%, the battery assembled from the lithium manganese iron phosphate synthesized in Example 2 can be cycled 1100 times, with an energy density of 140 Wh/kg. A battery assembled from the lithium manganese iron phosphate prepared by the conventional liquid phase method in Comparative Example 1 can be cycled 800 times, with an energy density of 130 Wh/kg. The improvement of cycle performance and energy density is mainly due to the high compaction density of the material.

The battery was allowed to stand in the fully charged state at room temperature for 28 days. The capacity before standing was defined as 100%, the remaining capacity ratio after standing, and charge-discharge recovered capacity ratio can reflect the self-discharge of the battery and the side reactions between the material and the electrolyte solution. The performance of the batteries of Example 3 and Comparative Example 1 before and after standing in the fully charged state at room temperature for 28 days was tested. The results are shown in Table 2 below.

TABLE 2

| Standing in the fully charged state at room temperature for 28 days | Comparative Example 1 | Example 3 |
|---|---|---|
| Before standing | 100.00% | 100.00% |
| Remaining | 92.44% | 94.79% |
| Recovered | 96.35% | 98.05% |

As can be seen from Table 2, in Comparative Example 1, the remaining capacity ratio of the battery after standing is 92.44%, and the recovery capacity ratio is 96.35%; in Example 3, the remaining capacity ratio of the battery after standing is 94.79%, and the recovery capacity ratio is 98.05%, both of which are better than those of the battery in Comparative Example 1, indicating that the material synthesized in the present invention has few side reactions with the electrolyte solution, which is mainly due to the small specific surface area of the material of Example 3.

EXAMPLE 4

Industrial grade $MnSO_4 \cdot H_2O$, which was used as a manganese source, was milled to micron size by a sand mill, heated to 150° C. so that manganese sulfate lost its crystal water, and then heated to 900° C. for thermal decomposition to form a lithium manganese phosphate precursor $Mn_3O_4$. The overall reaction equation was:

$$3MnSO_4 \cdot H_2O \rightarrow Mn_3O_4 + 3SO_2\uparrow + 3H_2O\uparrow.$$

$Mn_3O_4$, lithium carbonate, and ammonium dihydrogen phosphate were mixed and milled, and sintered in solid phase at 600° C. to obtain lithium manganese phosphate $LiMnPO_4$. The reaction equation was:

$$4Mn_3O_4 + 6Li_2CO_3 + 12NH_4H_2PO_4 \rightarrow 12LiMnPO_4 + 6CO_2\uparrow + 12NH_3\uparrow + 12H_2O\uparrow + 5O_2\uparrow.$$

EXAMPLE 5

Industrial grade $FeSO_4 \cdot 7H_2O$, which was used as iron source, was milled to micron size by a sand mill, heated to 70° C. to 98° C. so that ferric sulfate began to lose crystal water and generate $FeSO_4 \cdot 4H_2O$, then continued to be heated. At 86° C. to 159° C., $FeSO_4 \cdot 4H_2O$ lost crystal water to form $FeSO_4 \cdot H_2O$, and lost all the crystal water at 227° C. to 283° C. to form $FeSO_4$. Starting from 300° C., $FeSO_4$ began to melt and prepare for thermal decomposition. Then, when heated to 653° C. to 716° C., $FeSO_4$ was thermal decomposed to form a lithium iron phosphate precursor $Fe_2O_3$. The overall reaction equation was:

$$4FeSO_4 \cdot 7H_2O \rightarrow 2Fe_2O_3 + 4SO_2\uparrow + 28H_2O\uparrow + O_2\uparrow.$$

$Fe_2O_3$, lithium carbonate, and ammonium dihydrogen phosphate were mixed and milled, and sintered in solid phase at 700° C. to obtain lithium iron phosphate $LiFePO_4$. The reaction equation was:

$$Fe_2O_3 + Li_2CO_3 + 2NH_4H_2PO_4 \rightarrow 2\ LiFePO_4 + CO_2\uparrow + 2NH_3\uparrow + 2H_2O\uparrow + O_2\uparrow.$$

EXAMPLE 6

Industrial grade $FeSO_4 \cdot 7H_2O$, which was used as an iron source, was milled to micron size by a sand mill, heated to 200° C. so that iron sulfate lost its crystal water, and then heated to 1000° C. for thermal decomposition to form a lithium manganese iron phosphate precursor $Fe_2O_3$. The overall reaction equation was:

$$4FeSO_4 \cdot 7H_2O \rightarrow 2Fe_2O_3 + 4SO_2\uparrow + 28H_2O\uparrow + O_2\uparrow.$$

$Fe_2O_3$, lithium carbonate, manganese dihydrogen phosphate, and $Mn_2O_3$ were mixed and milled, and sintered in solid phase at 700° C. to obtain lithium manganese iron phosphate $LiFeMnPO_4$. The reaction equation was:

$$2Mn_2O_3 + 8Fe_2O_3 + 20Li_2CO_3 + 20Mn(H_2PO_4)_2 \cdot 2H_2O \rightarrow 40LiMn_{0.6}Fe_{0.4}PO_4 + 20CO_2\uparrow + 80H_2O\uparrow + 5O_2\uparrow.$$

EXAMPLE 7

Industrial grade $MnSO_4 \cdot H_2O$, which was used as a manganese source, was milled to micron size by a sand mill, heated to 150° C. so that manganese sulfate lost its crystal water, and then heated to 900° C. for thermal decomposition to form a lithium manganese iron phosphate precursor $Mn_3O_4$. The overall reaction equation was:

$$3MnSO_4 \cdot H_2O \rightarrow Mn_3O_4 + 3SO_2\uparrow + 3H_2O\uparrow.$$

$Mn_3O_4$, lithium carbonate, iron phosphate, and ammonium dihydrogen phosphate were mixed and milled, and sintered in solid phase at 600° C. to obtain lithium manganese iron phosphate $LiMn_{0.6}Fe_{0.4}PO_4$. The reaction equation was:

$$6NH_4H_2PO_4 + 2Mn_3O_4 + 5Li_2CO_3 + 4FePO_4 \cdot 2H_2O \rightarrow 10LiMn_{0.6}Fe_{0.4} + 5CO_2\uparrow + 17H_2O\uparrow + 2O_2 + 6NH_3\uparrow.$$

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A method for preparing lithium manganese iron phosphate, comprising steps of:

S1: mixing a manganese source in solid phase and an iron source in solid phase to obtain a first mixture in solid phase;

S2: sintering the first mixture in solid phase at 300° C. to 1200° C. to obtain a manganese iron oxide $(Mn_xFe_{1-x-y})_mO_n$;

S3: mixing the manganese iron oxide $(Mn_xFe_{1-x-y})_mO_n$ with a lithium source, a phosphorus source, and optionally a manganese source and/or an iron source in solid phase to obtain a second mixture; and S4: sintering the second mixture in solid phase at 350° C. to 900° C. to obtain lithium manganese iron phosphate $LiMn_xFe_{1-x-y}PO_4$, wherein $0 \le x \le 1$, $0 \le y \le 1$, $1{:}2 \le m{:}n \le 1{:}1$, and $0 < n \le 4$.

2. The method for preparing lithium manganese iron phosphate according to claim 1, wherein the manganese source is selected from the group consisting of manganese sulfate, manganese carbonate, manganese acetate, manganese phosphate, manganese nitrate, manganese oxalate and manganese citrate, with or without crystal water.

3. The method for preparing lithium manganese iron phosphate according to claim 1, wherein the iron source is selected from the group consisting of ferrous sulfate, ferrous carbonate, ferrous acetate, ferrous phosphate, ferrous nitrate, ferrous oxalate, ferrous citrate, ferric sulfate, ferric carbonate, ferric acetate, ferric phosphate, ferric nitrate, ferric oxalate and ferric citrate, with or without crystal water.

4. The method for preparing lithium manganese iron phosphate according to claim 1, wherein the lithium source is selected from the group consisting of lithium carbonate, lithium hydroxide, lithium phosphate, lithium oxalate, lithium acetate, lithium sulfate, lithium nitrate, and lithium chloride.

5. The method for preparing lithium manganese iron phosphate according to claim 1, wherein the phosphorus source is selected from the group consisting of ammonium dihydrogen phosphate, diammonium hydrogen phosphate, sodium dihydrogen phosphate, disodium hydrogen phosphate, sodium tripolyphosphate, phosphoric acid, calcium phosphate, phosphate ester, lithium dihydrogen phosphate, iron phosphate, lithium phosphate, lithium dihydrogen phosphate, and manganese phosphate.

6. The method for preparing lithium manganese iron phosphate according to claim 1, wherein in the steps S1 and S3, one or more of a carbon source, an M source, and an N source are added during the solid-phase mixing; and after the solid phase sintering in the steps S2 and S4, manganese iron oxide $(Mn_xFe_{1-x-y}M_y)_mO_nN_z/C$ and lithium manganese iron phosphate $LiMn_xFe_{1-x-y}MyPO_{4-z}N_z/C$ are obtained respectively;

wherein, the M source is a doped cation source and the N source is a doped anion source; and $0 \le x \le 1$, $0 \le y \le 1$, $0 \le z \le 0.1$, and $1{:}2 \le m{:}(n+z) \le 1{:}1$.

7. The method for preparing lithium manganese iron phosphate according to claim 6, wherein the carbon source is selected from the group consisting of sucrose, glucose, fructose, citric acid, phenolic resin, polyvinyl alcohol, polyethylene glycol, starch, carbon black, acetylene black, graphite, graphene, and conductive carbon tubes.

8. The method for preparing lithium manganese iron phosphate according to claim 6, wherein the cation source includes one or more of aluminum, magnesium, nickel, cobalt, titanium, copper, calcium, niobium, chromium, zinc, lanthanum, antimony, tellurium, strontium, tungsten, indium, and yttrium, and the anion source includes fluorine or/and sulfur.

* * * * *